United States Patent [19]

Aronson et al.

[11] 4,164,455

[45] Aug. 14, 1979

[54] PROCESS OF FORMING A SOLID TANTALUM CAPACITOR

[75] Inventors: Bernard S. Aronson, Elmira; Andrew Herczog; James A. Murphy, both of Painted Post, all of N.Y.

[73] Assignee: Corning Glass Works, Corning, N.Y.

[21] Appl. No.: 673,659

[22] Filed: Apr. 5, 1976

[51] Int. Cl.² ............................................. H01G 9/24
[52] U.S. Cl. ................................. 204/38 A; 29/570
[58] Field of Search ........................... 204/37 R, 38 A; 317/230; 361/322; 29/570

[56] References Cited

U.S. PATENT DOCUMENTS

| | | | |
|---|---|---|---|
| 1,804,782 | 5/1931 | Koenig | 432/47 X |
| 2,066,358 | 1/1937 | Musso | 432/205 |
| 2,936,514 | 5/1960 | Millard | 29/25.31 |
| 3,279,030 | 10/1966 | Wagner et al. | 204/38 A |
| 3,337,429 | 8/1967 | Zind | 204/38 A |
| 3,448,969 | 6/1969 | Windsor | 432/47 |
| 3,467,895 | 9/1969 | Silgailis | 317/230 |
| 3,473,092 | 10/1969 | Silgailis | 29/570 X |
| 3,607,385 | 9/1971 | Namikata et al. | 427/80 |
| 3,850,764 | 11/1974 | Herczog et al. | 204/38 A |
| 4,038,159 | 7/1977 | Nishino et al. | 204/38 A |
| 4,042,420 | 8/1977 | Nishino et al. | 204/38 A X |
| 4,105,513 | 8/1978 | Nishino et al. | 204/38 A |

Primary Examiner—G. L. Kaplan
Attorney, Agent, or Firm—Walter S. Zebrowski; Clarence R. Patty, Jr.

[57] ABSTRACT

A process for forming a solid tantalum capacitor is disclosed wherein the cathode is manganese dioxide formed by pyrolysis. The pyrolysis is performed in a nitrogen dioxide containing atmosphere at a temperature of between about 170° C. and 250° C., the nitrogen dioxide containing atmosphere comprising at least about 10% by volume of nitrogen dioxide, the remainder of said atmosphere being water vapor and gas inert in the pyrolysis process.

11 Claims, 4 Drawing Figures

$$\% \text{ EFFICIENCY} = \frac{\text{RATED VOLTAGE}}{\text{FORMATION VOLTAGE}} \times 100$$

PROCESS OF FORMING A SOLID TANTALUM CAPACITOR

BACKGROUND OF THE INVENTION

1. Field of the Invention

The present invention relates to a process of making solid tantalum capacitors wherein the anode is a porous tantalum pellet.

2. Description of the Prior Art

An important step in the manufacturing of solid tantalum capacitors is the deposition of manganese dioxide electrodes on the surface of anodically oxidized, partly sintered, porous tantalum metal. The tantalum pellet or slug is provided with a tantalum wire attached thereto by being fused-in, or otherwise, which tantalum wire is used for the anodic lead wire connection. The manganese dioxide coating, which is superimposed with exterior carbon and silver coatings for example, is used for the cathodic element of the capacitors. The manganese dioxide deposit is produced inside the pores of the anodized metal by repeated steps of impregnation and pyrolysis of manganese nitrate. This is followed by a reanodizing treatment which is used to reduce leakage current which increases as the result of manganese dioxide deposition treatments. In the process of making solid tantalum capacitors, reanodizing was used at least once. Ordinarily, reanodization is performed two or three times. A typical process characteristic of the prior art consists of three manganese dioxide depositions follwed by reanodization, then two manganese dioxide depositions and reanodization, and finally two more manganese dioxide depositions and reanodization. Manganese dioxide is deposited by thermal decomposition, pyrolysis, of manganese nitrate which is introduced into the porous body of the anodized tantalum as a concentrated aqueous solution. Pyrolysis is obtained by holding the impregnated anodes in any furnace having a temperature of 250° C. or higher for several minutes. A rough scale is formed on the exterior of the anodes processed in this manner, which scale has to be removed mechanically in order to fulfill the dimensional requirements of the finished capacitor. This operation, called sizing, is necessary although it is quite undesirable because it may damage the capacitor and is considered to be a factor responsible for low yield in manufacturing.

While sizing is undesirable, a more important problem with capacitors made by the prior art is their low voltage efficiency in terms of product capacitance times rated voltage divided by the weight of the tantalum used in the capacitor. This efficiency is called CV rating. In order to increase this efficiency, a tantalum powder of high specific surface area, lightly sintered to the desired shape of the anode, is used. This approach is limited, however, because the electrical connection between poorly sintered tantalum particles becomes tenuous causing high electrical resistance which leads to a high dissipation factor of the capacitor.

Another source of poor efficiency in capacitors is derating of their use voltage with respect to the forming, original anodizing, voltage. The thickness of the anodized tantalum oxide film increaes in proportion to the forming voltage while the capacitance decreases with increasing oxide thickness. Wet tantalum capacitors can be used at or near the forming voltage because any defect in the oxide film is "healed" by the action of the electrolyte in the DC bias applied to the anode. Solid electrolyte capacitors, having manganese dioxide electrodes, do not have this capacity and would break down irreversibly if exposed to the full formation voltage. Therefore, the voltage rating of a solid tantalum capacitor is usually only one fourth to one third of the forming voltage. This means that the efficiency in terms of CV rating for a given anode material is limited to 25 to 33 percent of the theoretical value. It is generally assumed that this loss of efficiency is caused by damage suffered by the anodized oxide film during the pyrolytic deposition of manganese dioxide. This consideration applies mainly to low voltage capacitors, for example 35 volts or less, where high area efficiency is used to maximize the CV rating independently of the damage suffered during processing. At high use voltage the purity of the dielectric film and its resistance to crystallization become additional factors of great importance for obtaining high efficiency, not dealt with in the present invention.

SUMMARY OF THE INVENTION

The objects of this invention are to provide a process for making high efficiency solid tantalum capacitors which provide uniform properties, good yield, and lower dissipation factors, and in which the need for sizing is eliminated, the damage suffered by the dielectric film during deposition of manganese dioxide electrodes is reduced, and which overcomes the heretofore noted disadvantages.

Broadly, according to the present invention, a porous tantalum pellet is anodized to form a dielectric layer thereon. A coating of manganese nitrate is deposited over the dielectric layer and the composite is heated to a temperature of between about 170° C. and 250° C. in a nitrogen dioxide containing atmosphere for a period of time sufficient to convert the manganese nitrate to a layer of manganese dioxide, the nitrogen dioxide atmosphere comprising at least about 10% by volume nitrogen dioxide and the remainder being water vapor and a gas inert in the pyrolysis or conversion process. If desired, additional coatings of manganese nitrate may be applied and the conversion process repeated. Additional objects, features, and advantages of the present invention will become apparent to those skilled in the art, from the following detailed description and the attached drawings on which, by way of example, only the preferred embodiments of this invention are illustrated.

DETAILED DESCRIPTION

It is to be noted that the drawings are illustrative and symbolic of the invention, and there is no intention to indicate scale or relative proportion of the elements shown therein.

Figure 1:
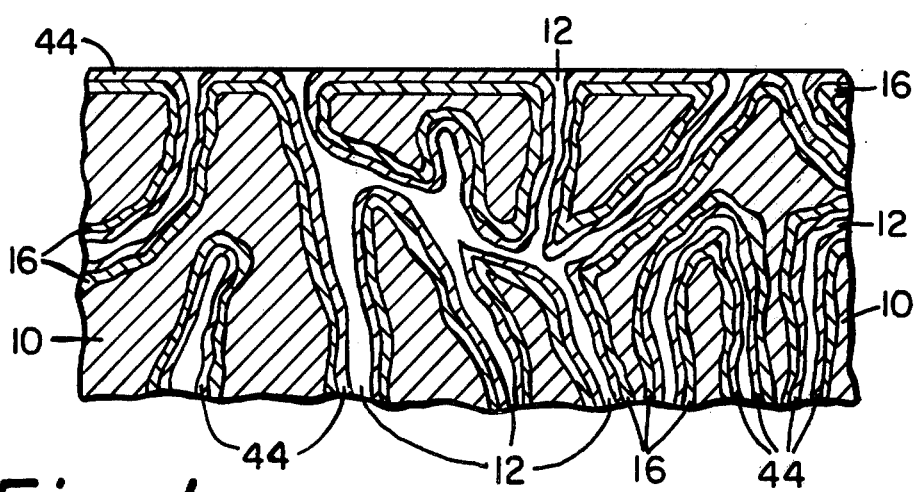
FIG. 1 is a fragmentary cross-sectional view of a porous tantalum pellet having dielectric and cathodic layers applied thereto.
Figure 2:
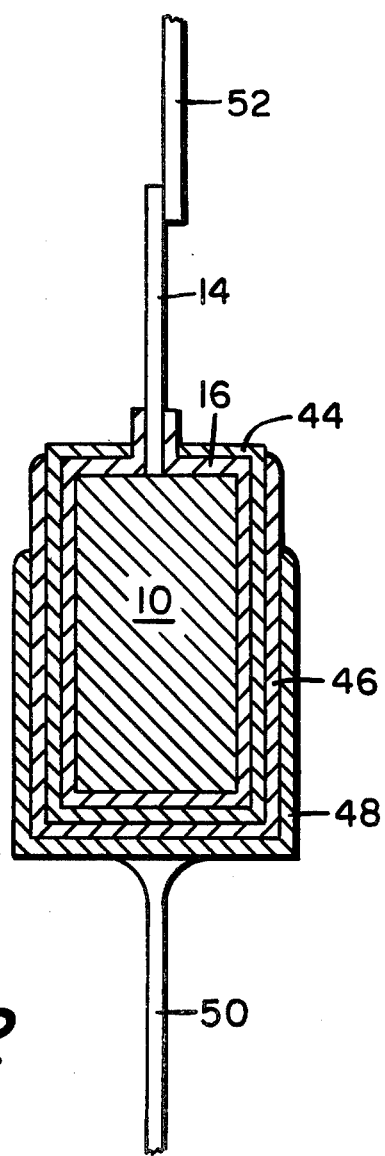
FIG. 2 is a cross-sectional view of a completed solid tantalum capacitor ready for encapsulation.

Referring to FIG. 1, there is shown a fragmentary cross-sectional portion, greatly enlarged, of porous tantalum pellet or slug 10. Pellet 10 is formed of a quantity of particulate tantalum material sintered together so as to leave a large number of openings and passages 12 between particles. While the particles are being sintered, a tantalum lead, such as lead 14 shown in FIG. 2, may be disposed within the tantalum particles and sintered therein, or may be electrically welded or otherwise attached to pellet 10 after sintering. The tantalum pellet thus formed is ready for having a dielectric layer 16 formed thereon. Dielectric layer 16 is formed by anodizing. Anodization consists of placing pellet 10 into an anodizing bath, such as one consisting of 0.1N nitric acid. A DC current is then passed through the bath and pellet to form a layer of Ta$_2$O$_5$ on the surface of the tantalum which will form dielectric layer 16. Anodization of tantalum is well known in the art and a layer of Ta$_2$O$_5$ having the desired thickness can be readily formed by one familiar with the art.

Figure 3:
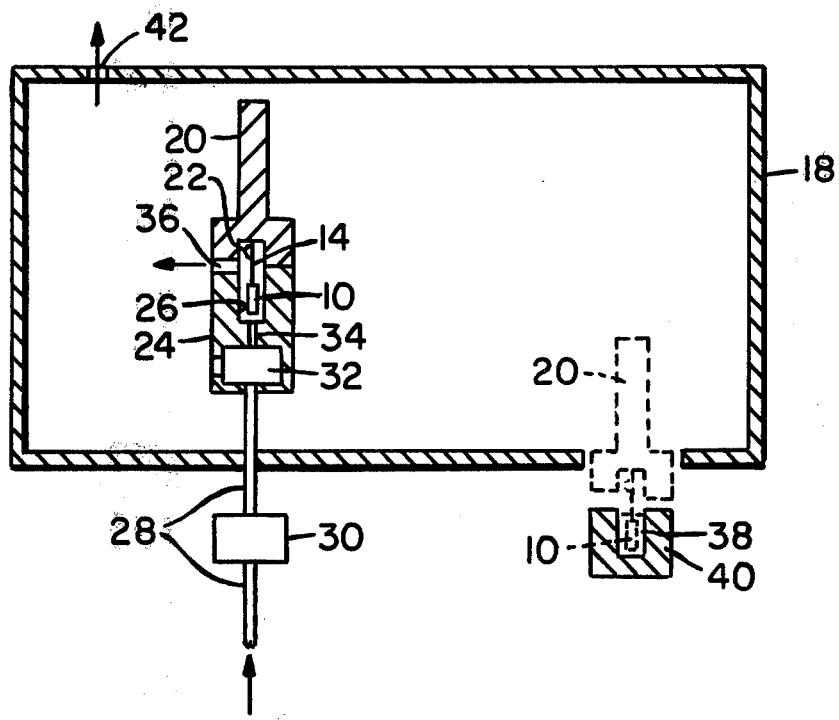
FIG. 3 is a diagrammatic illustration of an apparatus suitable for performing the present process.

Referring additionally to FIG. 3, there is shown an apparatus for performing the process of the present invention. This apparatus merely illustrates one means for performing the present process and is not limiting upon the present invention. The apparatus of FIG. 3 comprises a oven 18 within which is disposed a pellet holder 20 from which pellet 10 is suspended by means of lead 14 and pellet support 22. Pellet holder 20 engages pellet chamber housing 24 so that pellet 10 is disposed within chamber 26 thereof. A source of gas, not shown, is connected to pellet chamber housing 24 through conduit 28 and gas preheater 30. Gas is introduced to pellet chamber housing 24 through plenum 32 and passage 34. Gass is exhausted from pellet chamber housing 24 through passage 36. Also illustrated in FIG. 3, is a manganese nitrate bath 38 disposed in housing 40. As will be hereinafter described in detail, pellet holder 20 is translatable to a position as illustrated by dashed lines so as to permit pellet 10 to be immersed in the manganese nitrate bath. Gases are vented from oven 18 by means of passage 42.

A concentrated aqueous solution of manganese nitrate is then introduced into the porous body of the anodized tantalum pellet by dipping the pellet, either cold or preheated up to a temperature of about 250° C., in the solution, allowing time for the solution to penetrate the porous body which, for example, may take one to thirty seconds for ordinary size pellets. A suitable concentration of an aqueous solution of manganese nitrate for this purpose has a density of about 1.6 and is a 50 to 52 percent by weight solution. After the manganese nitrate solution is introduced into the porous body, the body is placed in the oven at a temperature of between about 170° C. and 250° C. for a period of time sufficient to convert the manganese nitrate to a layer of manganese dioxide. The time necessary for this conversion depends upon the oven temperature, heat transfer rate and atmosphere but generally is between about 5 to 20 minutes. The preferred oven temperature for this treatment is about 225° C. While the pyrolysis process takes place, a nitrogen dioxide containing atmosphere is provided within chamber 26, which nitrogen dioxide containing atmosphere comprises a least about 10% by volume nitrogen dioxide with the remainder being water vapor and gas inert in the conversion process. As will be understood, some nitrogen dioxide is evolved during the conversion of magnaese nitrate to manganese dioxide. To control the proper level of manganese dioxide within chamber 26, a quantity of gas is introduced into chamber 26 so as to maintain the predetermined desired level of nitrogen dioxide therein. Since some nitrogen dioxide is evolved during the pyrolysis process, the gas introduced into chamber 26 from an exterior source need have such a quantity of nitrogen dioxide and flow rate as to maintain the proper level of nitrogen dioxide within the chamber. Accordingly, the gas introduced into the chamber may be water vapor and gas inert in the conversion process and containng nitrogen dioxide if at all only to the extent necessary to provide the desired atmosphere. Gases inert in the conversion process may be air, nitrogen, or the like in order that the gas introduced from the exterior source permits the conversion of manganese nitrate to manganese dioxide to take place it is preheated to a temperature of between about 200° C. and 250° C.

Referring again to FIGS. 1 and 2, there is shown pellet 10 with dielectric layer 16 and manganese dioxide film 44 formed thereon. Since a lead cannot be readily attached to manganese dioxide film 44, a layer of carbon 46 is applied over the cathodic manganese dioxide film, and a layer of silver 48 is applied over the carbon layer. The application of the carbon layer and silver layer is well known in the art and does not form part of the present invention but is described simply to show how lead 50 may thereafter be attached to the manganese dioxide film. Lead 50 may be soldered or otherwise attached to the silver film. To this assembly, an exterior lead 52 is attached to tantalum lead 14 in the manner and for the purposes well known in the art. The article so formed is then ready for encapsulation by any suitable means.

Figure 4:
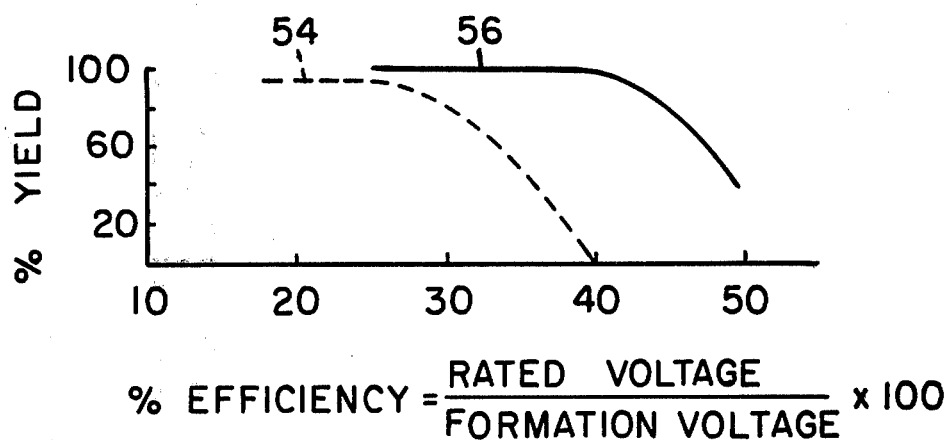
FIG. 4 is a graph illustrating the greatly improved yield and efficiency of a solid tantalum capacitor formed by the present process as compared to the prior art.

It has been ound that through the use of the present method, greatly improved properties of solid tantalum capacitors may be obtained as illustrated in FIG. 4 wherein curve 54 illuastrates the capacitor efficiency as a function of yield of prior art capacitors whereas curve 56 illustrates capacitor efficiency as a function of yield of a capacitor formed by the present method. Figure 4 shows nearly a twofold improvement in yield and efficiency of capacitors processed by the present method. Furthermore, the capacitors formed in accordance with the present method show little or no scale formation, therefore, require no sizing and provide lower dissipation factors than heretofore possible without atmosphere control.

As a typical example, a tantalum pellet or slug having a weight of 0.295 grams is obtained by sintering a quantity of tantalum powder at a temperature of 1900° C. for about 20 minutes. The pellet lead is then welded to a stainless steel pellet support and the pellet is then anodized in a dilute nitric acid solution at a temperature of 70° C. having a concentration of 0.1N at 45 volts DC for approximately 2 hours to form an anodic oxide, Ta$_2$O$_5$. The pellet is then disposed within a pellet holder by means of the pellet support, the pellet holder being disposed within an oven. The anodized pellet is then preheated to a temperature of about 225° C. for 6 minutes. This composite is then impregnated with a 50 percent by weight aqueous solution of manganese nitrate for about 1 minute. The immersion in the manganese nitrate solution is accomplished by disposing the pellet holder through a opening in the oven adjacent which a manganese nitrate bath is disposed. As will be understood, this opening in the oven can be readily closed off at all times except when the pellet is immersed in the manganese nitrate bath. The pellet holder is then placed on a pellet chamber housing so that the pellet is suspended within a chamber in the housing. The housing chamber has a volume of approximately 100 cubic centimeters per gram of tantalum pellet weight. A quantity of nitrogen is then preheated to a temperature of 225° C. and flowed into the pellet chamber at a rate of 350 cc/min. while the pellet is raised to a temperature of 225° C. within the oven. Of course, the pellet chamber is vented into the oven at a rate of at least 350 cc/min. The conversion of manganese nitrate to manganese dioxide produces nitrogen dioxide and water within the pellet chamber of the present volume during this pyrolysis in such quantities as to maintain the nitrogen dioxide containing atmosphere within the pellet chamber at about 10 percent by volume nitrogen dioxide, 10 percent by volume water vapor, the remainder being nitrogen gas. The pyrolysis is continued for a period of 6 minutes until a layer of manganese nitrate is formed on the pellet. The steps of immersion in the manganese nitrate solution and pyrolysis in a nitrogen dioxide containing atmosphere may be repeated as many times as is necessry to produce a manganese dioxide layer of desired parameters. Thereafter, a carbon layer is applied over the manganese dioxide film by immersing the pellet in an aqueous colloidal graphite suspension and drying for ½ hour at 150° C. This procedure is then repeated. Care must be taken so that the graphite does not contact the top of the pellet. A silver layer is then applied over the carbn layer of dipping the composite so formed about three fourths of its length in an air drying silver paint or suspension, that is particulate silver in an organic vehicle, such as Dupont 7059 produced by the E. I. DuPont DeNemours Incorporated. This coating is then dried for ½ hour in air and then dried in a furnace at 150° C. for ½ hour. The finished capacitor is then encapsulated. This finished capacitor has characteristics and stability qualifying it for operation at 20 volts and has a capacitance of 27 microfarads. The CV efficiency of this capacitor is 1210. The exterior surface of the pellet did not have to be sized for further processing and encapsulation.

A capacitor made by conventional processing having a 27 microfarad and 20 volt rating would require more than twice the weight of tatalum used in the above unit. Furthermore, a capacitor made in accordance with the present method results in manganese dioxide film having good adherence to the anodized tantalum surface.

Although the resent invention has been described with respect to details of certain embodiments thereof, it is not intended that such details be limitations upon the scope of the invention except insofar as set forth in the following claims.

We claim:

1. In the method of forming a solid tantalum capacitor including anodizing the surface of a porous tantalum pellet to form a dielectric layer thereon and depositing a coating of manganese nitrae over said dielectric layer, the improvement comprising heating the composite so formed to a temperature of between about 170° C. and about 250° C. within an enclosed in a nitrogen dioxide containing atmosphere for a period of time sufficient to convert said manganese nitrate to a layer of manganese dioxide, said enclosure being semiclosed and in communication with the surrounding atmosphere exclusively through at least one vent formed therein, said nitrogen dioxide atmosphere being immediately adjacent to the surface of said pellet and comprising at least about 10% by volume nitrogen dioxide and the remainder being water vapor and gas inert in the conversion process, whereby scale formation on said layer of manganese dioxide is eliminated or takes place to an insingnificant degree eliminating the need for sizing the capacitor pellet.

2. The method of claim 1 further commmprising the step of simultaneously venting said enclosure and introducing gas from a exterior source into said enclosure so as to maintain said nitrogen dioxide atmosphere.

3. The method of claim 2 wherein said gas from an exterior source comprises nitrogen dioxide and a gas inert in the conversion process.

4. The method of claim 2 wherein said gas from an exterior source comprises a gas inert in the conversion process.

5. The method of claim 4 wherein said gas inert in the conversion process is nitrogen.

6. The method of claim 1 further comprising the step of preheating the anodized pellet before depositing said coating of manganese nitrate over said dielectric layer.

7. The method of claim 6 wherein said anodized pellet is preheated to a temperature of up to about 250° C.

8. The method of claim 7 further comprising the step of simultaneously venting said enclosure and introducing gas from a exterior source into said enclosure so as to maintain said nitrogen dioxide atmosphere.

9. In the method of forming a solid tantalum capacitor including anodizing the surface of a porous tantalum pellet to form a dielectric layer thereon and depositing a coating of manganese nitrate over said dielectric layer, the improvement comprising heating the composite so formed to a temperature of between about 170° C. and about 250° C. within an enclosure for a period of time sufficient to convert said manganese nitrate to a layer of manganese dioxide, said enclosure being semiclosed and in communication with the surrounding atmosphere exclusively through at least one vent formed therein, the atmosphere within said enclosure during the process of conversion of manganese nitrate to manganese dioxide comprising at least about 10% by volume nitrogen dioxide and the remainder being water vapor and gas inert in the conversion process, any water vapor present in said enclosure atmosphere resulting substantially wholly from said conversion process, whereby scale formation on said layer of manganese dioxide is eliminated or takes place to an insignificant degree, eliminating the need for sizing the capacitor pellet.

10. The method of claim 9 further comprising the step of introducing into said enclosure a gas inert in the conversion process.

11. The method of claim 10 further comprising the step of introducing nitrogen dioxide into said enclosure along with said inert gas.

* * * * *

UNITED STATES PATENT AND TRADEMARK OFFICE
CERTIFICATE OF CORRECTION

PATENT NO. : 4,164,455  Page 1 of 2
DATED : August 14, 1979
INVENTOR(S) : Bernard S. Aronson, Andrew Herczog, James A. Murphy It is certified that error appears in the above-identified patent and that said Letters Patent are hereby corrected as shown below:

Column 1, line 62, "increaes" should be -- increases --.

Column 3, line 34, "Gass" should be -- Gas --.

Column 4, line 34, "ound" should be -- found --.

Column 4, line 37, "illuastrates" should be -- illustrates --.

Column 5, line 22, "necessry" should be -- necessary --.

Column 5, line 29, "carbn" should be -- carbon --.

Column 5, line 29, "of" should be -- by --.

Column 5, line 48, "resent" should be -- present --.

Column 5, line 57, "nitrae" should be -- nitrate --.

Column 5, line 60, "enclosed" should be -- enclosure --.

Column 6, line 9, "insingnificant" should be -- insignificant --.

UNITED STATES PATENT AND TRADEMARK OFFICE
CERTIFICATE OF CORRECTION

PATENT NO. : 4,164,455

DATED : August 14, 1979

INVENTOR(S) : Bernard S. Aronson, Andrew Herczog, James A. Murphy

It is certified that error appears in the above-identified patent and that said Letters Patent are hereby corrected as shown below:

Column 6, line 12, "commprising" should be -- comprising --.

Column 6, line 14, "a" should be -- an --.

Column 6, line 31, "a" should be -- an --.

Signed and Sealed this

Seventeenth Day of June 1980

[SEAL]

Attest:

SIDNEY A. DIAMOND

Attesting Officer

Commissioner of Patents and Trademarks